(12) United States Patent
Shpilyuck et al.

(10) Patent No.: US 8,914,517 B1
(45) Date of Patent: Dec. 16, 2014

(54) METHOD AND SYSTEM FOR PREDICTIVE LOAD BALANCING

(71) Applicant: EMC Corporation, Hopkinton, MA (US)

(72) Inventors: Boris Shpilyuck, Dublin, CA (US); Dmitry Limonov, Dublin, CA (US); Dmitry Volchegursky, Haifa (IL); Alex Rankov, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 261 days.

(21) Appl. No.: 13/627,121

(22) Filed: Sep. 26, 2012

(51) Int. Cl.
*G06F 15/173* (2006.01)

(52) U.S. Cl.
USPC ............ 709/226; 709/224; 709/229; 709/235

(58) Field of Classification Search
None
See application file for complete search history.

(56) References Cited

U.S. PATENT DOCUMENTS

| | | | |
|---|---|---|---|
| 4,748,558 A * | 5/1988 | Hirosawa et al. | 718/105 |
| 2005/0249199 A1 * | 11/2005 | Albert et al. | 370/352 |
| 2006/0221821 A1 * | 10/2006 | Ransom et al. | 370/229 |
| 2014/0115163 A1 * | 4/2014 | Matousek | 709/226 |
| 2014/0129715 A1 * | 5/2014 | Mortazavi | 709/226 |

* cited by examiner

*Primary Examiner* — Mohamed Ibrahim
(74) *Attorney, Agent, or Firm* — Dergosits & Noah LLP; Todd A. Noah (57) ABSTRACT

A method for load balancing resource requests among a plurality of servers is disclosed and includes providing an enterprise content management (ECM) system coupled to processing servers for managing a plurality of resources, where each resource is identified by a resource identifier. The ECM system includes a load manager that receives a first plurality of requests. Each request includes a resource identifier and an action, and is assigned to a processing server for processing. The method includes recording performance statistics for each request when each request is processed. Request types based on the resource identifier and the action of each request are also identified. For each request type, a weighting factor is generated based on the performance statistics for each request of the request type. Thereafter, a new request is assigned to a processing server based on the weighting factor for request type of the new request.

20 Claims, 4 Drawing Sheets

METHOD AND SYSTEM FOR PREDICTIVE LOAD BALANCING

BACKGROUND

According to the Association for Information and Image Management, Enterprise content management (ECM) refers to "the strategies, methods and tools used to capture, manage, store, preserve, and deliver content and documents related to organizational processes. ECM covers the management of information within the entire scope of an enterprise whether that information is in the form of a paper document, an electronic file, a database print stream, or even an email." The organization and management of such enterprise resources is essential for current data intense business environments. An ECM system can make the management of enterprise resources easier through simplifying storage, security, version control, process routing, and retention. The benefits to an enterprise include improved efficiency, better control, and reduced costs.

An ECM system must provide continuous and secure access to the enterprise resources, and therefore is designed to receive and process requests from users and/or customers from all parts of the world and at all hours of the day. Typically, in order to handle the large number of requests efficiently, an ECM system utilizes a cluster of computer processing nodes, e.g., servers in a server farm, to process the requests in batches and/or in parallel. To optimize efficiency and performance, the ECM system uses a load balancing computer node that receives the requests and then assigns them to the computer processing nodes in the cluster in order to distribute the workload evenly throughout the cluster.

While straightforward in principle, evenly distributing the workload amongst the processing nodes is a difficult and challenging task. In one technique, the load balancing node assigns an equal number of requests to each of the processing nodes. This approach, however, is flawed because the requests are not identical to one another, and the processing cost and/or time can vary from request to request. In other words, an equal number of requests is not necessarily equivalent to an equal workload.

In another technique, the variation in the difficulty between requests is reflected by a difficulty ranking, e.g., a first type of request is ranked five stars (most difficult) and another type of request is ranked 1 star (least difficult). Using these rankings, the load balancing node can assign requests based on their respective difficulty rankings and therefore more evenly distribute the workload throughout the cluster. This technique, however, requires an administrator to evaluate each request and to assign the ranking, which might be feasible for a limited number of requests against a simple content management system. An ECM system, however, is far from simple. Indeed, a typical ECM system manages thousands, if not millions, of resources, and the requests received by an ECM system can involve an assortment of commands. Manually evaluating and ranking each request to an ECM system is not feasible.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides for automated workload balancing among a plurality of processing servers for an ECM system. According to an embodiment, an ECM system is provided that allows an enterprise to organize and store its resources that relate to the enterprise's processes. The enterprise resources can include documents, files, web content, records, digital media, and any addressable object. The ECM system includes a load manager component that is configured to receive a first plurality of requests that each identify a resource and an action. When the requests are received, the load manager assigns each request to a processing server for processing.

In an embodiment, the ECM system can include a request manager component configured to record performance statistics for each request when that request is processed by a processing server. For example, the performance statistics can include how much time the processing server needed to process the request and/or a cost to process the request, e.g., how many CPU cycles. In addition, the request manager component can be configured to identify request types based on the resources and actions included in the requests, and to generate a weighting factor for each request type based on the performance statistics for each request of the request type. In an embodiment, the weighting factor of a request type represents the processing difficulty of requests associated with the request type. Accordingly, all requests associated with a request type will also be associated with the request type's weighting factor.

When a new set of requests is received, each of the new requests can be associated with a request type and therefore, a weighting factor. The load manager component can then assign a new request to a processing server based on the new request's weighting factor. In an embodiment, the request manager component can continuously update the weighting factors for the request types as the new requests are processed and new performance statistics are collected. Moreover, as resources and/or actions are added, updated and/or modified, request types can also be added, updated and/or modified.

Figure 1:
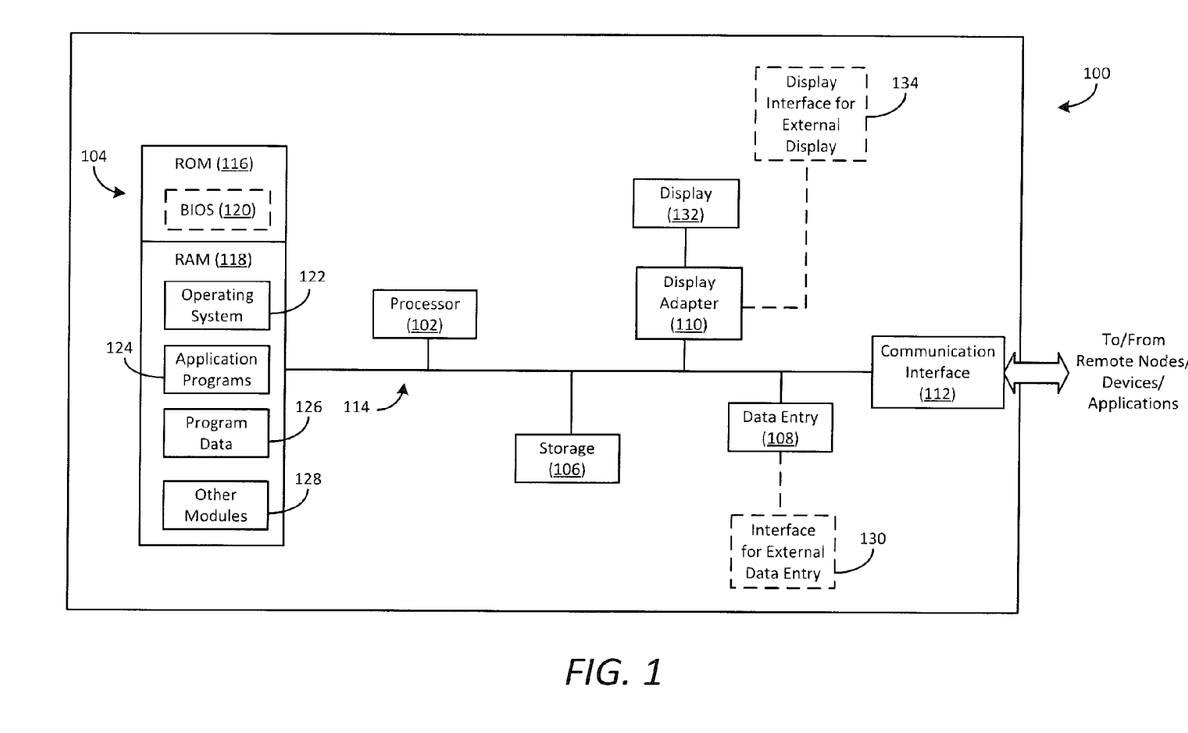
FIG. 1 is a block diagram illustrating an exemplary hardware device in which the subject matter may be implemented.

Prior to describing the subject matter in detail, an exemplary hardware device in which the subject matter may be implemented is described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
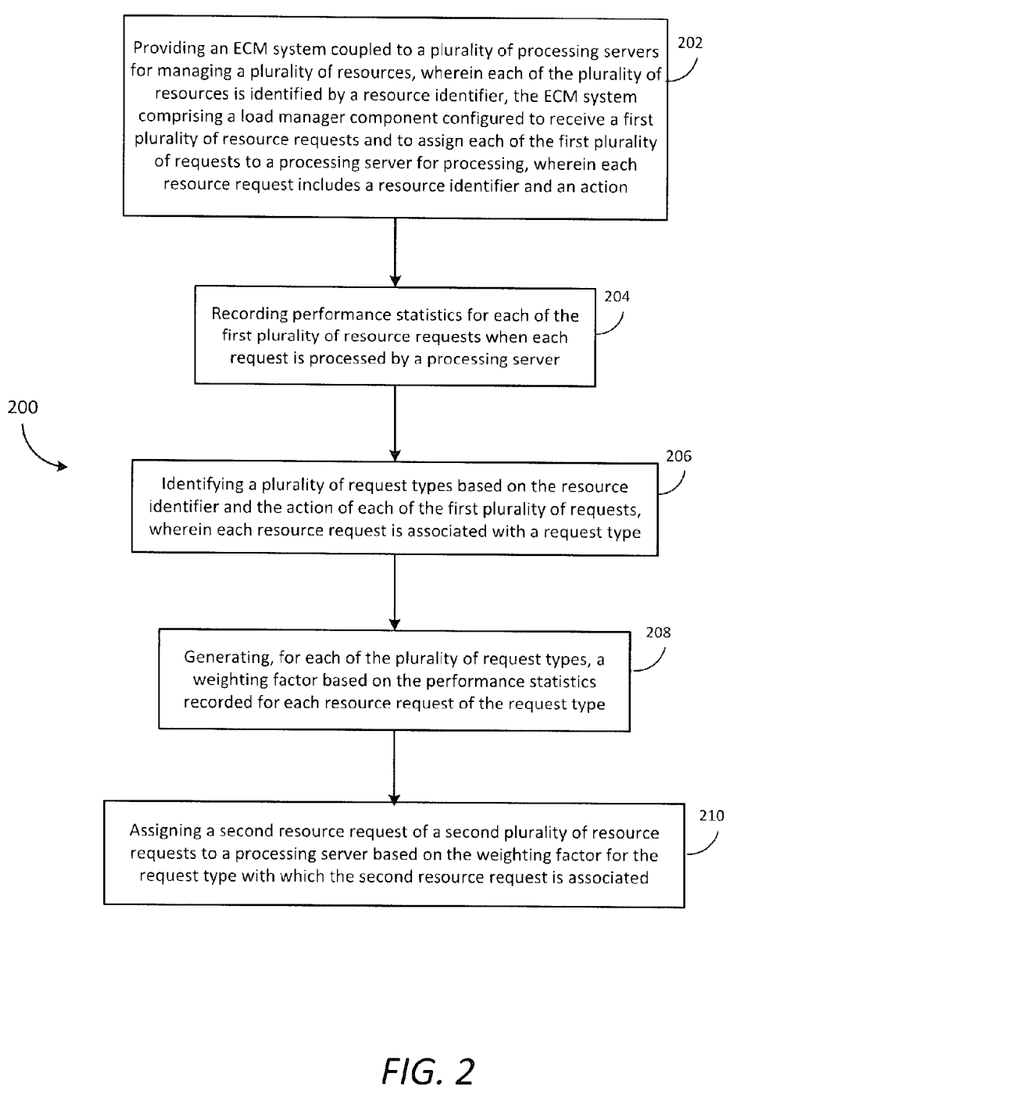
FIG. 2 is a flow diagram illustrating an exemplary method for load balancing resource requests among a plurality of servers according to an exemplary embodiment.
Figure 3:
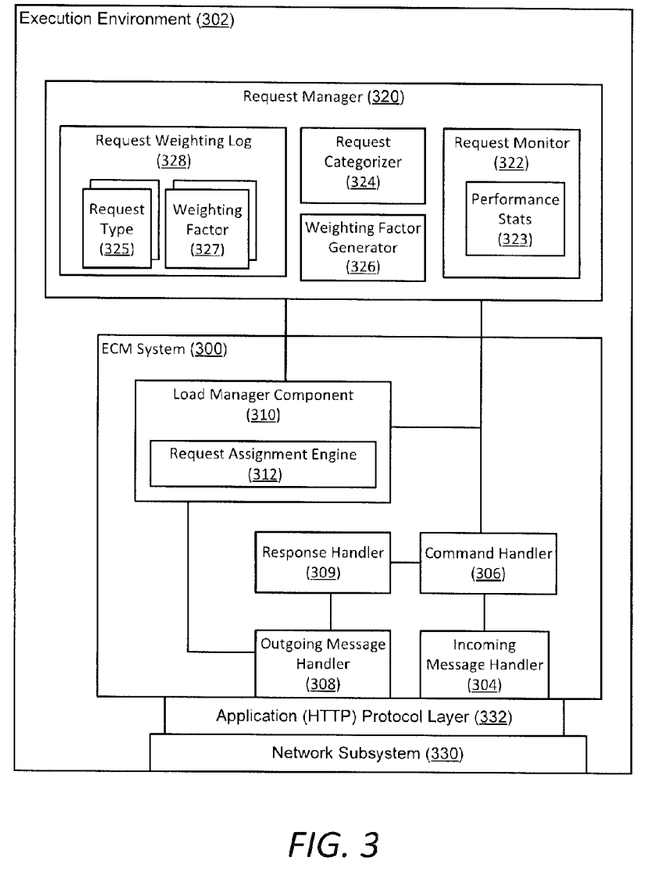
FIG. 3 is a block diagram illustrating an exemplary system for load balancing resource requests among a plurality of servers according to an exemplary embodiment.

Referring now to FIG. 2, a flow diagram is presented illustrating a method 200 for load balancing resource requests among a plurality of servers according to an exemplary embodiment. FIG. 3 is a block diagram illustrating an exemplary system for load balancing resource requests among a plurality of servers according to embodiments of the subject matter described herein. The method 200 illustrated in FIG. 2 can be carried out by, for example, at least some of the components in the exemplary arrangement of components illustrated in FIG. 3. The arrangement of components in FIG. 3 may be implemented by some or all of the components of the hardware device 100 of FIG. 1.

Figure 4:
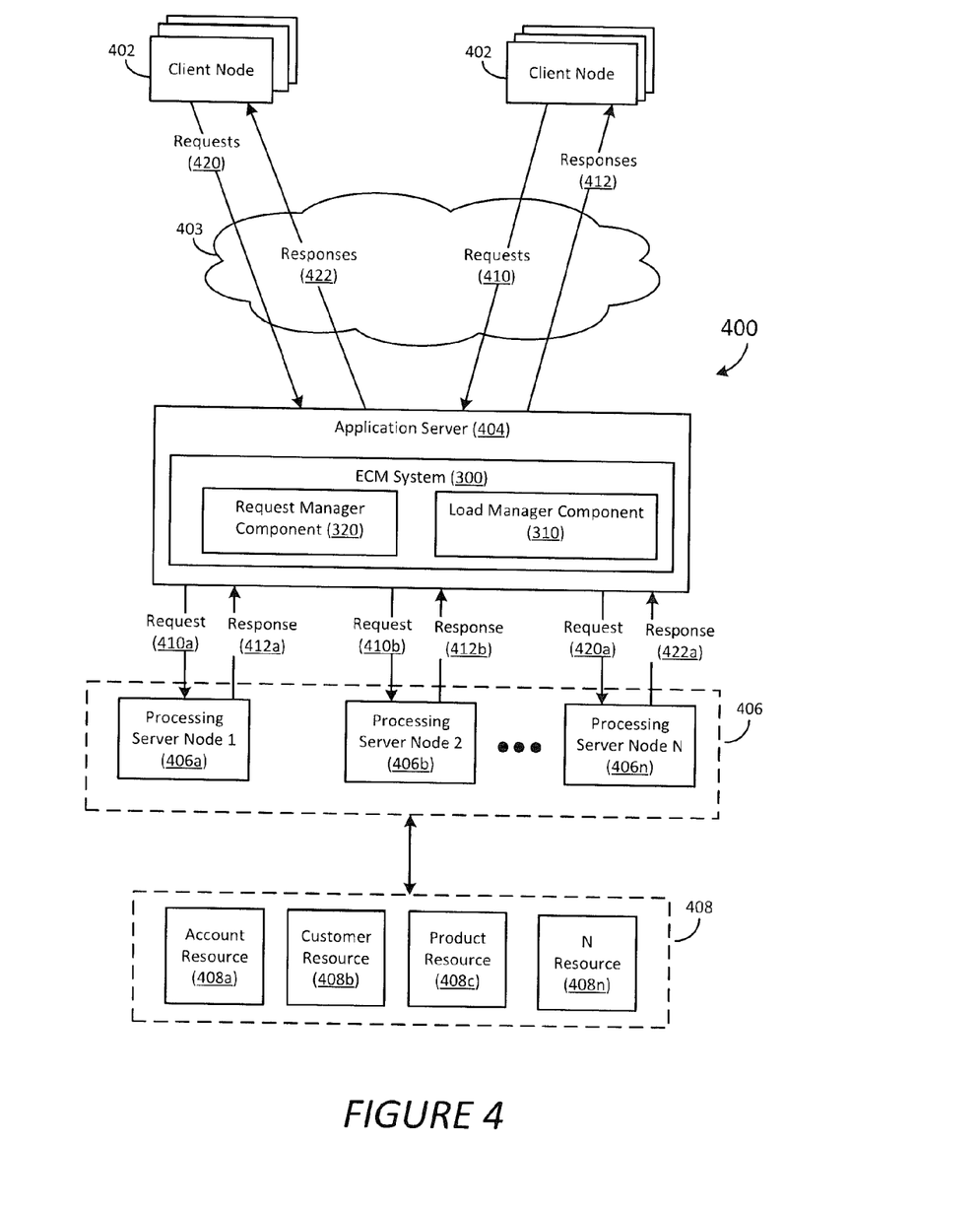
FIG. 4 is a block diagram illustrating a network in which a system for load balancing resource requests among a plurality of servers can be implemented.

FIG. 3 illustrates components that are configured to operate within an execution environment hosted by a computer device and/or multiple computer devices, as in a distributed execution environment. For example, FIG. 4 illustrates a plurality of computer devices 402, 404, 406 communicatively coupled to one another via a network 403, such as the Internet, where an application server 404 can be configured to provide an execution environment configured to support the operation of the components illustrated in FIG. 3 and/or their analogs. Exemplary computer devices can include physical or virtual desktop computers, servers, networking devices, notebook computers, PDAs, mobile phones, digital image capture devices, and the like. For example, in an embodiment, the application server 404 can be a webserver, and the processing servers 406 can be virtual servers in a cloud computing environment.

With reference to FIG. 2, in block 202, an enterprise content management (ECM) system coupled to a plurality of processing servers for managing a plurality of resources is provided. The ECM system includes a load manager component configured to receive a first plurality of resource requests and to assign each of the first plurality of requests to a processing server for processing. According to an embodiment, each resource is identified by a resource identifier, and each resource request includes a resource identifier and an action.

Illustrated in FIG. 3 and FIG. 4 is an ECM system 300 including components adapted for operating in an execution environment 302. The execution environment 302, or an analog, can be provided by a computer device such as the application server 404. In an embodiment, the ECM system 300 is configured to manage enterprise resources 408 that can include documents, files, web content, and other addressable objects. A system administrator can define resources of various types, such as an account resource 408a, a customer resource 408b, a product resource 408c and the like 408n.

In an embodiment, the ECM system 300 can be configured to receive a first plurality of resource requests 410 from at least one requesting client node 402. The ECM system 300 can be configured to receive the requests 410 via a network subsystem 330 and an application protocol layer, or other higher protocol layer, as illustrated by an exemplary HTTP protocol layer 332, among many possible standard and proprietary protocol layers. These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP). A command handler component 306 in the ECM system 300 can be configured to receive the requests 410 via an incoming message handler 304 and to route the requests 410 to the load manager component 310. The load manager component 310 can assign each of the first plurality of resource requests 410 to one of several processing server nodes 406a, 406b in a server cluster, all of which are configured to process the requests 410.

According to an embodiment, the ECM system 300 can be a representational state transfer (REST) service. As such, each resource 408 is identified by a unique resource identifier, and each resource request 410 includes a resource identifier and an action required. In an embodiment, when the ECM system 300 is implemented using HTTP, the resource identifier can be a uniform resource identifier (URI) associated with the resource 408, and the action can be an HTTP method, e.g., GET, PUT, POST, DELETE. Accordingly, each resource request 410 can include a URI and an HTTP method.

According to an embodiment, the resource identifier, e.g., URI, associated with each resource 408 can be a uniform resource locator (URL) that identifies a resource type and an object. For example, consider the following URL fragments:

(1)/my-application/customer/3
(2)/my-application/account/5
(3)/my-application/account/7

The resource identified by URL (1) is a customer resource type 408b with an object identifier of three (3), and the resource identified by URL (2) is an account resource type 408a with an object identifier of five (5). The resource identified by URL (3) is also an account resource type 408a, but with an object identifier of seven (7). Thus, the second and third resources can be uniquely identified although they are of the same resource type 408a.

Referring again to FIG. 2, when each of the first plurality of requests 410a, 410b is assigned to and processed by a processing server 406a, 406b, performance statistics for each of the first plurality of resource requests are recorded in block 204. According to an embodiment, a resource manager component 320 can be configured to record performance statistics for each of the first plurality of resource requests 410a, 410b when each request is processed by a processing server 406a, 406b. In an embodiment, the request manager component 320 can be included in the ECM system 300, as shown in FIG. 4. In another embodiment, the request manager component 320 can be provided outside of the ECM system 300 as a separate component, as shown in FIG. 3. In this case, the request manager component 320 can be configured to interact with more than one ECM system 300 in a distributed environment.

In an embodiment, the request manager component 320 can include a request monitor 322 that monitors each of the first plurality of resource requests 410a, 410b and collects performance statistics 323 associated with the processing of each resource request. For example, when the command handler 306 receives a request, e.g., 410a, and forwards it to the load manager component 310, the load manager component 310 can forward the resource request 410a to the request manager component 320. Alternatively or in addition, the request can be routed directly to the request manager component 320 and to the load manager component 310. When the request 410a is received, the request monitor 322 can be configured to monitor the time associated with processing the request 410a.

For example, when the request 410a is received, the request monitor 322 can be configured to record a process start time for the request 410a. When the processing server 406a processes the request 410a and provides a response 412a back to the ECM system 300, the command handler 306 can receive and forward the response 412a to a response handler component 309, which is configured to transmit responses 412 to the requesting client node(s) 402 over the network 403. In an embodiment, the response 412a can also be forwarded to the request monitor 322, which can record an end time that can be used to determine the performance statistics 323, e.g., the processing time, for the request 410a.

Alternatively or in addition, the processing server 406a can track its performance statistics, e.g., the processing time, for the request 410a and provide that information along with its response 412a to the ECM system 300. In this case, when the request monitor 322 receives the response 412a, it can extract the performance statistics 323 directly from the response 412a. According to an embodiment, the performance statistics 323 can be collected for each of the first plurality of requests 410 and stored in a data structure (not shown) associated with the request manager component 320.

Referring again to FIG. 2, in addition to recording performance statistics 323 for each of the first plurality of resource requests 410, a plurality of request types are identified, in block 206, based on the resource identifier and the action of each of the first plurality of requests 410, wherein each resource request is associated with a request type. According to an embodiment, the request manager component 320 can include a request categorizer 324 configured to identify request types based on the resource identifier and the action of each of the first plurality of requests 410.

As stated above, each of the requests 410 includes a resource identifier and an action, and in an embodiment, the resource identifier includes a resource type and an object identifier. Accordingly, each of the requests 410 includes a resource type, an object identifier, and an action. In an embodiment, a request type 325 can be defined by a particular resource type paired with a particular action, i.e., a resource type/action pair. Accordingly, when a resource request 410a is received by the request manager component 320, the request categorizer 324 can be configured, in an embodiment, to examine the request 410a to determine its resource type and its action. Based on that determination, the request categorizer 324 can identify a request type 325 corresponding to the request's resource type and action, and can associate that request type 325 with the request 410a. Accordingly, all requests 410 that include the same resource type and the same action are associated with the same request type 325.

Thus, for example, consider the following exemplary request fragments:

(1) /my-application/customer/3, HTTP method=POST
(2) /my-application/account/5, HTTP method=POST
(3) /my-application/account/7, HTTP method=POST Request (2) and request (3) have the same resource type, e.g., account, and the same action, e.g., POST, and therefore are of the same request type despite being directed to different resources, e.g., objects 5 and 7. Request (1) has a different resource type, e.g., customer, and therefore is associated with a different request type corresponding to a customer/POST pair.

As stated above, the ECM system 300 can be implemented as a RESTful service. As such, each resource request 410a, 410b operates on a single resource identified by the resource identifier. A resource that is dependent on the resource identified in a request 410a is updated, if needed, separately via a dedicated request identifying the dependent resource and the action. Accordingly, because dependent resources are handled separately and do not affect the processing of the request 410a, any requests directed to the same resource type and action, i.e., any requests of the same request type 325, can be considered similar in processing difficulty. Thus, for example, referring to the exemplary request fragments above, the processing difficulty for request (2) will be substantially the same for request (3) because they are of the same request type. The same cannot be assumed for the processing difficulty for request (1), however, because request (1) is of a different request type 325.

Referring again to FIG. 2, once the request types 325 have been identified and each of the first plurality of requests 410 has been associated with a request type 325, a weighting factor is generated, in block 208, for each request type 325 based on the performance statistics 323 recorded for each request 410 of the request type 325. In an embodiment, the request manager component 320 can include a weighting factor generator 326 configured to generate, for each of the plurality of request types 325, a weighting factor 327 based on the performance statistics 323 recorded for each resource request of the request type 325.

According to an embodiment, the weighting factor 327 for a request type 325 indicates how difficult a request of that type is to process. As indicated above, the performance statistics 323 for a request, e.g., 410a, can include the processing time needed by a processing server 406a to process the request, and generally, it is assumed that more difficult requests require more processing time. According to an embodiment, the weighting factor generator 326 can be configured to collect the performance statistics 323, e.g., the processing times, for all requests associated with a request type 325, and to calculate an average processing time for the request type 325. In an embodiment, the weighting factor generator 326 can then determine the weighting factor 327 for the request type 325 based on the average processing time.

In an embodiment, the weighting factor 327 can simply be the average processing time for the request type 325. Alternatively or in addition, the weighting factor 327 for a request type 325 can be derived by normalizing the average processing times for each of the various request types 325. For example, the average processing times for each of the request types 325 can be normalized so that the weighting factor 327 is a number between one (1) and ten (10), where a weighting factor of one (1) corresponds to a least difficult request type and a weighting factor of ten (10) corresponds to a most difficult request type.

In an embodiment, once the weighting factor 327 for each request type 325 has been generated, the weighting factor generator 326 can be configured to store the request types 325 and their respective weighting factors 327 in a request weighting log 328. The request weighting log 328 can be maintained by the request manager component 320 in an embodiment. Alternatively or in addition, when the request manager component 320 is external to the ECM system 300, the request weighting log 328 can be managed by the ECM system 300.

Once the request types 325 and their respective weighting factors 327 have been determined and stored in the request weighting log 328, the load manager component 310 can be configured to receive a second plurality of requests 420 and to provide automatic load balancing using a weighted round robin technique. Thus, referring again to FIG. 2, when the second plurality of resource requests 420 is received, a second resource request 420a of the second plurality of resource requests 420 is assigned to a processing server 406n, in block 210, based on the weighting factor 327 for the request type 325 with which the second resource request 420a is associated.

According to an embodiment, the load manager component 310 can include a request assignment engine 312 which is configured to determine to which processing server 406 a resource request 420a will be assigned. For example, in an embodiment, when the second request 420a is received, the assignment engine 312 can be configured to extract the request's resource identifier and action from the request 420a and to use that information to determine the request type 325 associated with the second request 420a. Once the request type 325 is determined, the assignment engine 312 can be configured to identify the weighting factor 327 for the request type 325. In an embodiment, the assignment engine 312 can invoke the request manager component 320 to return the weighting factor 327 for the request type 325 using the request weighting log 328. Alternatively or in addition, the assignment engine 312 can access the request weighting log 328 directly to identify the weighting factor 327.

Once the assignment engine 312 has identified the weighting factor 327 for the second request 420a, the assignment engine 312 determines which of the processing servers 406 is available to process the request 420a. In an embodiment, the assignment engine 312 can be configured to monitor each server's 406 existing workload, which can be defined as a sum of the weighting factors 327 of each of the requests currently assigned to the server. Based on the current workloads of the servers 406 and on the weighting factor 327 of the second request 420a, the assignment engine 312 can select a processing server 406n that is available, e.g., a server that has the lowest current workload, to process the request 420a, and can assign the request 420a to that server 406n for processing. Alternatively or in addition, in an embodiment, the assignment engine 312 can also bundle a plurality of requests 420 and can assign the bundled requests to a processing server 406n based on the processing server's current workload and on an aggregate weighting factor of the bundled requests 420.

In an embodiment, when the second request 420a is directed to a new resource type and/or a new action, the assignment engine 312 will not be able to determine an existing request type 325 for with the second request 420a. In this case, the assignment engine 312 can be configured to invoke the request categorizer 324 to identify a new request type for the second request 420a that corresponds to the new resource type and/or the new action. Although a weighting factor is not yet determined for the new request type, the assignment engine 312 can assign the second request 420a to a processing server that has the lowest current workload for processing.

According to an embodiment, while the second resource request 420a is processed, the request monitor 322 can continue to record the performance statistics 323 for the second request 420a, and the weighting factor generator 326 can be configured to regenerate (or generate) the weighting factor for the request type 325 associated with the second resource request 420a. For example, the weighting factor generator 326 can be configured to collect the performance statistics 323, e.g., the processing times, for all requests associated with a request type 325, including the second request 420a, and to recalculate (or calculate) the average processing time for the request type 325. In an embodiment, the weighting factor generator 326 can then update (or generate) the weighting factor 327 for the request type 325 based on the recalculated (or calculated) average processing time.

According to exemplary embodiments, automatic load balancing based on the processing difficulty of requests, and not the raw number of requests, is implemented by collecting performance statistics for a first plurality of requests, and categorizing the first plurality of requests into a plurality of request types based on each request's resource identifier and action. Using the performance statistics, a weighting factor for each request type can be generated. According to an embodiment, the weighting factor for a request type represents the processing difficulty of requests of the request type. Accordingly, when a new request is received, the weighting factor for the request type associated with the new request can be used to assign the new request to a processing server that is available to process the request. Moreover, because the workload of a server is based on the cumulative weighting factors of the requests assigned to the server, and not on the total number of requests, the overall workload of the ECM system can be more evenly distributed among the processing servers.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for load balancing resource requests among a plurality of servers, the system comprising:
    a processor-based enterprise content management (ECM) system executed on a computer coupled to a plurality of processing servers for managing a plurality of resources, wherein each of the plurality of resources is identified by a resource identifier, the ECM system comprising a load manager component configured to receive a first plurality of resource requests and to assign each of the first plurality of requests to a processing server for processing, wherein each resource request includes a resource identifier and an action; and
    a processor-based request manager component executed on the computer and configured to record performance statistics for each of the first plurality of resource request when each request is processed by a processing server, to identify a plurality of request types based on the resource identifier and the action of each of the first plurality of requests, wherein each resource request is associated with a request type, and to generate, for each of the plurality of request types, a weighting factor based on the performance statistics recorded for each resource request of the request type,
    wherein when a second resource request of a second plurality of resource requests is received, the load manager component is configured to assign the second resource request to a processing server based on the weighting factor for the request type with which the second resource request is associated.

2. The system of claim 1 wherein the processor-based request manager component is configured to generate the weighting factor for a request type by:
    collecting the performance statistics for each resource request associated with the request type, wherein the performance statistics for a resource request includes a processing time to process the request;
    calculating an average processing time for the request type; and
    determining the weighting factor for the request type based on the average processing time for the request type.

3. The system of claim 2 wherein the request manager component is further configured for storing the weighting factor for each of the plurality of request types in a request weighting log.

4. The system of claim 3 wherein when the second resource request of the second plurality of resource requests is received, the load manager component is configured to assign the second resource request to a server by:
    determining the request type with which the second resource request is associated based on the second request's resource identifier and action;
    identifying the weighting factor for the request type using the request weighting log;
    determining that a first server of the plurality of servers is available to process the second resource request based on the weighting factor and on a current workload associated with the first server; and
    assigning the second resource request to the first server for processing.

5. The system of claim 2 wherein when the second resource request is processed by the server, the processor-based request manager component is further configured to record performance statistics for the second resource request and to regenerate the weighting factor for the request type associated with the second resource request based on the performance statistics for the second resource request.

6. The system of claim 5 wherein the request manager component is configured to regenerate the weighting factor for a request type by:
    collecting the performance statistics for the second resource request;
    recalculating the average processing time for the request; and
    updating the weighting factor for the request type based on the recalculated average processing time.

7. The system of claim 1 wherein the performance statistics for a resource request includes a time to process the request.

8. The system of claim 1 wherein a resource is an addressable object, and the resource identifier comprises a resource type and an object identifier, and wherein a first request type is associated with a first resource type and a first action, and each resource request associated with the first request type includes the first resource type and the first action.

9. The system of claim 1 wherein the ECM system is a representational state transfer (REST) service implemented using HTTP, and wherein the resource identifier in each resource request is a uniform resource identifier (URI) and the action is an HTTP method.

10. The method of claim 1 wherein the ECM system is a representational state transfer (REST) service and wherein the resource identifier in each resource request is a uniform resource identifier (URI) and the action is an HTTP method.

11. A computer program product, comprising a non-transitory computer-readable medium having a computer-readable program code embodied therein for load balancing resource requests among a plurality of servers, which instructions, when executed by one or more processors, cause the one or more processors to carry out the steps of:
    providing an enterprise content management (ECM) system coupled to a plurality of processing servers for managing a plurality of resources, wherein each of the plurality of resources is identified by a resource identifier, the enterprise content management system comprising a load manager component configured to receive a first plurality of resource requests and to assign each of the first plurality of resource requests to a processing server for processing, wherein each resource request includes a resource identifier and an action;
    recording performance statistics for each of the first plurality of resource requests when each request is processed by a processing server;
    identifying a plurality of request types based on the resource identifier and the action of each of the first plurality of requests, wherein each resource request is associated with a request type;
    generating, for each of the plurality of request types, a weighting factor based on the performance statistics recorded for each resource request of the request type; and assigning a second resource request of a second plurality of resource requests to a processing server based on the weighting factor for the request type with which the second resource request is associated.

12. A method for load balancing resource requests among a plurality of servers, the method comprising:
providing, by a server, an enterprise content management (ECM) system coupled to a plurality of processing servers for managing a plurality of resources, wherein each of the plurality of resources is identified by a resource identifier, the enterprise content management system comprising a load manager component configured to receive a first plurality of resource requests and to assign each of the first plurality of requests to a processing server for processing, wherein each resource request includes a resource identifier and an action;
recording, by the server, performance statistics for each of the first plurality of resource requests when each request is processed by a processing server;
identifying, by the server, a plurality of request types based on the resource identifier and the action of each of the first plurality of requests, wherein each resource request is associated with a request type;
generating, by the server, for each of the plurality of request types, a weighting factor based on the performance statistics recorded for each resource request of the request type; and
assigning a second resource request of a second plurality of resource requests to a processing server based on the weighting factor for the request type with which the second resource request is associated.

13. The method of claim 12 wherein generating the weighting factor for a request type comprises:
collecting the performance statistics for each resource request associated with the request type, wherein the performance statistics for a resource request includes a processing time to process the request;
calculating an average processing time for the request type; and
determining the weighting factor for the request type based on the average processing time for the request type.

14. The method of claim 13 wherein when the second resource request is processed by the server, the method further includes recording performance statistics for the second resource request.

15. The method of claim 14 further comprising regenerating the weighting factor for the request type associated with the second resource request based on the performance statistics for the second resource request.

16. The system of claim 15 wherein regenerating the weighting factor for the request type comprises:
collecting the performance statistics for the second resource request;
recalculating the average processing time for the request type; and
updating the weighting factor for the request type based on the recalculated average processing time.

17. The method of claim 13 further comprising storing the weighting factor for each of the plurality of request types in a request weighting log.

18. The method of claim 17 wherein assigning the second resource request to a server comprises:
determining the request type with which the second resource request is associated based on the second request's resource identifier and action;
identifying the weighting factor for the request type using the request weighting log;
determining that a first server of the plurality of servers is available to process the second resource request based on the weighting factor and on a current workload associated with the first server; and
assigning the second resource request to the first server for processing.

19. The method of claim 12 wherein the performance statistics for a resource request includes at least one of a time to process the request, and a cost to process the request.

20. The method of claim 12 wherein a resource is an addressable object, and the resource identifier comprises a resource type and an object identifier, and wherein a first request type is associated with a first resource type and a first action, and each resource request associated with the first request type includes the first resource type and the first action.

* * * * *